United States Patent
Leong et al.

(10) Patent No.: US 9,825,835 B2
(45) Date of Patent: *Nov. 21, 2017

(54) SYSTEMS AND METHODS FOR IMPLEMENTING A TRAFFIC VISIBILITY NETWORK

(71) Applicant: Gigamon Inc., Santa Clara, CA (US)

(72) Inventors: Patrick Pak Tak Leong, Palo Alto, CA (US); Paul Andrew Hooper, Los Gatos, CA (US)

(73) Assignee: Gigamon Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,741

(22) Filed: Feb. 9, 2015

(65) Prior Publication Data

US 2016/0014006 A1 Jan. 14, 2016

Related U.S. Application Data

(63) Continuation of application No. 13/631,692, filed on Sep. 28, 2012, now Pat. No. 8,953,458.

(Continued)

(51) Int. Cl.
*H04L 12/26* (2006.01)
*H04L 12/24* (2006.01)
*H04L 29/06* (2006.01)

(52) U.S. Cl.
CPC ............ *H04L 43/10* (2013.01); *H04L 41/12* (2013.01); *H04L 43/06* (2013.01); *H04L 43/18* (2013.01);

(Continued)

(58) Field of Classification Search
CPC ..... H04W 24/00; H04W 24/02; H04W 24/04; H04W 24/06; H04W 24/08; H04W 24/10;
(Continued)

(56) References Cited

U.S. PATENT DOCUMENTS 6,836,466 B1 * 12/2004 Kant ................. H04L 29/06
370/232
7,424,018 B2 9/2008 Gallatin et al.
(Continued)

FOREIGN PATENT DOCUMENTS

WO WO 2008/067849 6/2008

OTHER PUBLICATIONS

Non-Final Office Action for related U.S. Appl. No. 13/631,691 dated Mar. 10, 2014 (20 pages).
(Continued)

*Primary Examiner* — Benjamin H Elliott, IV
*Assistant Examiner* — Prince A Mensah
(74) *Attorney, Agent, or Firm* — Perkins Coie LLP

(57) ABSTRACT

A method of packet processing, includes: providing a plurality of network appliances that form a cluster, wherein two or more of the plurality of network appliances in the cluster are located at different geographical locations, are communicatively coupled via a private network or an Internet, and are configured to collectively perform out-of-band packet processing; receiving a packet by one of the network appliances in the cluster; processing the packet using two or more of the plurality of the appliances in the cluster; and passing the packet to one or more network monitoring tools after the packet is processed.

20 Claims, 11 Drawing Sheets

Related U.S. Application Data

(60) Provisional application No. 61/541,757, filed on Sep. 30, 2011.

(52) U.S. Cl.
CPC .............. *H04L 63/30* (2013.01); *H04L 41/14* (2013.01); *H04L 43/028* (2013.01)

(58) Field of Classification Search
CPC ....... H04L 41/12; H04L 41/14; H04L 43/028; H04L 43/10; H04L 43/06; H04L 43/18; H04L 63/30
See application file for complete search history.

(56) References Cited

U.S. PATENT DOCUMENTS

| | | | |
|---|---|---|---|
| 7,436,832 B2 | 10/2008 | Gallatin et al. | |
| 7,440,467 B2 | 10/2008 | Gallatin et al. | |
| 7,792,047 B2 | 9/2010 | Gallatin et al. | |
| 7,835,358 B2 | 11/2010 | Gallatin et al. | |
| 7,889,748 B1* | 2/2011 | Leong | H04L 12/4645 370/249 |
| 8,315,256 B2 | 11/2012 | Leong et al. | |
| 2002/0159458 A1* | 10/2002 | Foster | H04L 49/357 370/392 |
| 2003/0076781 A1* | 4/2003 | Enomoto | H04L 47/10 370/229 |
| 2005/0099951 A1* | 5/2005 | Mohan | H04L 43/0811 370/241 |
| 2005/0271065 A1* | 12/2005 | Gallatin | H04L 12/4645 370/401 |
| 2006/0268932 A1* | 11/2006 | Singh | H04L 12/4633 370/468 |
| 2009/0040926 A1 | 2/2009 | Li et al. | |
| 2009/0262745 A1* | 10/2009 | Leong | H04L 12/4625 370/396 |
| 2010/0122175 A1 | 5/2010 | Gupta et al. | |
| 2011/0222535 A1 | 9/2011 | Suganthi et al. | |
| 2012/0227109 A1* | 9/2012 | Dimuro | G06F 21/56 726/24 |

OTHER PUBLICATIONS

Notice of Allowance for related U.S. Appl. No. 13/631,691 dated Sep. 26, 2014 (20 pages).

International Search Report and Written Opinion dated Dec. 24, 2012 for PCT/US2012/058061.

Supplementary European Search Report Communication pursuant to Rules 70(2) and 70a(2) EPC for EP Patent Application No. 1283466430, 1 page.

Extended European Search Report dated Feb. 3, 2015 for EP Patent Application No. 12834664.0, 8 pages.

Gigamon Systems LLC: "GigaVUE—Product Brief, Gigabit Security and Performance Monitoring for Enterprise Networks", Internet Citation, Aug. 15, 2007 (Aug. 15, 2007), p. 1, XP002538004, retrieved from the internet: URL: http://web.archive.org/web/20070815021951/www.gigamon.com/pdf/GigamonSystemsOnePageProductBrief.pdf [retrieved on Jul. 21, 2009].

\* cited by examiner

SYSTEMS AND METHODS FOR IMPLEMENTING A TRAFFIC VISIBILITY NETWORK

REPLATED APPLICATION DATA

This application is a continuation of U.S. patent application Ser. No. 13/631,692, pending, which claims priority to, and the benefit of, U.S. Provisional Patent Application No. 61/541,757, filed on Sep. 30, 2011, lapsed, the entire disclosures of both of the above applications are expressly incorporated by reference herein.

FIELD

This application relates generally to network switch devices and systems, and more specifically, to systems and methods for monitoring virtualized network.

BACKGROUND

Network switch apparatus has been used to copy and forward network traffic from the span ports and tapped links of a production network to one or more management or monitoring systems (called network "tools") including, but not limited to, network sniffers, intrusion detection systems, application monitors, forensic recorders, etc. The traffic can be intelligently multiplexed, aggregated, filtered or distributed according to user-defined "map rules" while on the way from the ingress point (a network port) to the egress point (a tool port). Such network switch apparatus is commercially available from Gigamon in Milpitas, Calif. Multiple network switch apparatuses may be combined (stacked) together to form a much bigger network switch apparatus (system) where traffic can enter any port of one network switch apparatus and be forwarded out of another port on the same or a different network switch apparatus via stacking links. Such devices/systems have been described in U.S. Pat. Nos. 7,440,467, 7,436,832, 7,424,018, 7,792,047, 7,889,748, and 7,835,358, the disclosures of all of which are expressly incorporated by reference herein.

Over the past decade, there has been a very significant growth of the amount of network traffic in both enterprise and telecom service providers' networks. This growth in traffic comes from various sources, including the increasing popularity of smart phones; the rapid growth in the adoption of video-based applications and service; and the widespread deployment of virtualization technologies where by many applications demanding network access can be run on the same physical host machine. During the same period, more sensitive information is being sent over the Internet including online banking and trading, electronic medical records, distance learning, etc., that in combination with the growing trend to outsource application delivery by IT organizations, is driving more traffic and information into the "Cloud". From a security and compliance standpoint, there are concerns about where this information is being stored, how it is accessed and whether it is copied to an unauthorized third-party.

Also, virtualization brings in new challenges to network visibility. At the highest level, the network is quickly evolving from a static component of infrastructure to a very dynamic and agile component. For example, a monitoring or management tool has no easy access to the traffic created by the communications between any two virtual machines that reside within the same physical host. Additionally, when virtual machines are moved from one physical host to another, they create a number of network issues such as a static IP address suddenly showing up at a different location, or that any tool tracking this virtual machine may have to find a different physical port span to access the traffic flow once the virtual machine is relocated.

Furthermore, network traffic is becoming more mobile. Traffic destined for the user community within an enterprise is now delivered across and between multiple geographic locations as a user moves from one location to another. As a further complication, although a user may be static, he/she may be "mobile" between devices so traffic may be delivered over local networks, local wireless networks and third-party service provider networks at the same time. How to monitor and secure a user's traffic becomes significantly more challenging since no single point tool can cover all the traffic.

SUMMARY

In accordance with some embodiments, a method of packet processing, includes: providing a plurality of network appliances that form a cluster, wherein two or more of the plurality of network appliances in the cluster are located at different geographical locations, are communicatively coupled via a private network or an Internet, and are configured to collectively perform out-of-band packet processing; receiving a packet by one of the network appliances in the cluster; processing the packet using two or more of the plurality of the appliances in the cluster; and passing the packet to one or more network monitoring tools after the packet is processed.

In one or more embodiments, the method may also include determining a state of a source that is associated with the packet, wherein the packet is passed based on the determined state of the source.

In one or more embodiments, the method may also include changing a network traffic mapping utilized by one or more of the plurality of network appliances based on the determined state of the source.

In one or more embodiments, the state of the source may be determined by receiving information regarding the source from an in-band device.

In one or more embodiments, the state of the source may be determined by receiving information regarding the source from an out-of-band device.

In one or more embodiments, the state of the source may be determined by analyzing network traffic pattern from the source.

In one or more embodiments, the determined state of the source may indicate whether an increased level of network monitoring is desired.

In one or more embodiments, the cluster of the plurality of network appliances may include a filter for determining which of the one or more network monitoring tools to pass the packet; if the determined state of the source has a first state value, then the cluster passes the packet to a first one of the one or more network monitoring tools; and if the determined state of the source has a second state value, then the cluster passes the packet to a second one of the one or more network monitoring tools.

In one or more embodiments, the cluster of the plurality of network appliances may include a filter for determining which of the one or more network monitoring tools to pass the packet; if the determined state of the source has a first state value, then the cluster passes the packet to one of the network monitoring tools; and if the determined state of the source has a second state value, then the cluster passes the packet to two of the one or more network monitoring tools.

In one or more embodiments, the plurality of network appliances may include a first network appliance, and a second network appliance, and the act of processing the packet may include passing the packet from the first network appliance to the second network appliance.

In one or more embodiments, the packet may be passed from a stacking egress port at the first network appliance to a stacking ingress port at the second network appliance.

In one or more embodiments, each of the first and second network appliances may have a network port for receiving packets from a network, and an instrument port.

In one or more embodiments, each of the first and second network appliances may be an out-of-band device.

In accordance with other embodiments, a packet processing system includes: a plurality of network appliances forming a cluster, wherein two or more of the plurality of network appliances in the cluster are located at different geographical locations, are communicatively coupled via a private network or an Internet, and are configured to collectively perform out-of-band packet processing; wherein the cluster is configured to receive a packet, process the packet using two or more of the plurality of the appliances in the cluster, and pass the packet to one or more network monitoring tools after the packet is processed.

In one or more embodiments, the cluster may be configured to determine a state of a source that is associated with the packet, and wherein the cluster may be configured to pass the packet based on the determined state of the source.

In one or more embodiments, the cluster may be configured to change a network traffic mapping utilized by one or more of the plurality of network appliances based on the determined state of the source.

In one or more embodiments, the cluster may be configured to determine the state of the source based on information regarding the source from an in-band device.

In one or more embodiments, the cluster may be configured to determine the state of the source based on information regarding the source from an out-of-band device.

In one or more embodiments, the cluster may be configured to determine the state of the source by analyzing network traffic pattern from the source.

In one or more embodiments, the determined state of the source may indicate whether an increased level of network monitoring is desired.

In one or more embodiments, the cluster of the plurality of network appliances may include a filter for determining which of the one or more network monitoring tools to pass the packet; the cluster may be configured to pass the packet to a first one of the one or more network monitoring tools if the determined state of the source has a first state value; and the cluster may be configured to pass the packet to a second one of the one or more network monitoring tools if the determined state of the source has a second state value.

In one or more embodiments, the cluster of the plurality of network appliances may include a filter for determining which of the one or more network monitoring tools to pass the packet; the cluster may be configured to pass the packet to one of the network monitoring tools if the determined state of the source has a first state value; and the cluster may be configured to pass the packet to two of the one or more network monitoring tools if the determined state of the source has a second state value.

In one or more embodiments, the plurality of network appliances may include a first network appliance, and a second network appliance, and the cluster may be configured to perform the act of processing the packet by passing the packet from the first network appliance to the second network appliance.

In one or more embodiments, the packet may be passed from a stacking egress port at the first network appliance to a stacking ingress port at the second network appliance.

In one or more embodiments, each of the first and second network appliances may have a network port for receiving packets from a network, and an instrument port.

In one or more embodiments, each of the first and second network appliances may be an out-of-band device.

In accordance with other embodiments, a method of packet processing includes: receiving a packet at a network port of a network switch appliance, the network switch appliance having a plurality of instrument ports; determining a state of a source associated with the packet at multiple time points; and changing a filter at a network switch system that includes the network switch appliance based at least in part on the determined state of the source.

In one or more embodiments, the filter may be configured for packet filtering to one or more of the instrument ports, and the act of changing the filter may include changing at least one of the one or more of the instrument ports for the packet filtering.

In one or more embodiments, the state of the source may be determined by receiving information regarding the source from an in-band device.

In one or more embodiments, the state of the source may be determined by receiving information regarding the source from an out-of-band device.

In one or more embodiments, the state of the source may be determined by analyzing network traffic pattern from the source.

In one or more embodiments, the determined state of the source may indicate whether an increased level of network monitoring is desired.

In one or more embodiments, if the determined state of the source has a first state value, then the network appliance passes the packet to a first one of the instrument ports; and if the determined state of the source has a second state value, then the network appliance passes the packet to a second one of the instrument ports.

In one or more embodiments, if the determined state of the source has a first state value, then the network appliance passes the packet to one of the instrument ports; and if the determined state of the source has a second state value, then the network appliance passes the packet to two of the instrument ports.

In one or more embodiments, the source may include a mobile device, and the act of determining the state of the source may include determining a location of the mobile device.

In one or more embodiments, the source may comprise a user of a device that provides the packet, and the act of determining the state of the source may comprise determining a state of the user.

In one or more embodiments, the act of determining the state of the user may include determining a location of the user.

In one or more embodiments, the act of determining the state of the user may include determining an activity being performed by the user.

In one or more embodiments, the act of determining the state of the user may include determining a type of device being used by the user.

In one or more embodiments, the network switch appliance may be an out-of-band device.

In accordance with other embodiments, a packet processing system includes: a network switch appliance having a network port for receiving a packet and a plurality of instrument ports; and a processor configured to determine a state of a source associated with the packet at multiple time points, and to change a filter at a network switch system that includes the network switch appliance based at least in part on the determined state of the source.

In one or more embodiments, the filter may be configured for packet filtering to one or more of the instrument ports, and the processor may be configured to change the filter by changing at least one of the one or more of the instrument ports for the packet filtering.

In one or more embodiments, the processor may be configured to receive information regarding the source from an in-band device.

In one or more embodiments, the processor may be configured to receive information regarding the source from an out-of-band device.

In one or more embodiments, the processor may be configured to determine the state of the source by analyzing network traffic pattern from the source.

In one or more embodiments, the determined state of the source may indicate whether an increased level of network monitoring is desired.

In one or more embodiments, if the determined state of the source has a first state value, then the network appliance passes the packet to a first one of the instrument ports; and if the determined state of the source has a second state value, then the network appliance passes the packet to a second one of the instrument ports.

In one or more embodiments, if the determined state of the source has a first state value, then the network appliance passes the packet to one of the instrument ports; and if the determined state of the source has a second state value, then the network appliance passes the packet to two of the instrument ports.

In one or more embodiments, the source may include a mobile device, and the processor may be configured to determine the state of the source by determining a location of the mobile device.

In one or more embodiments, the source may comprise a user of a device that provides the packet, and the processor may be configured to determine the state of the source by determining a state of the user.

In one or more embodiments, the processor may be configured to determine the state of the user by determining a location of the user.

In one or more embodiments, the processor may be configured to determine the state of the user by determining an activity being performed by the user.

In one or more embodiments, the processor may be configured to determine the state of the user by determining a type of device being used by the user.

In one or more embodiments, the network switch appliance may be an out-of-band device.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DESCRIPTION OF THE EMBODIMENTS

Figure 1:
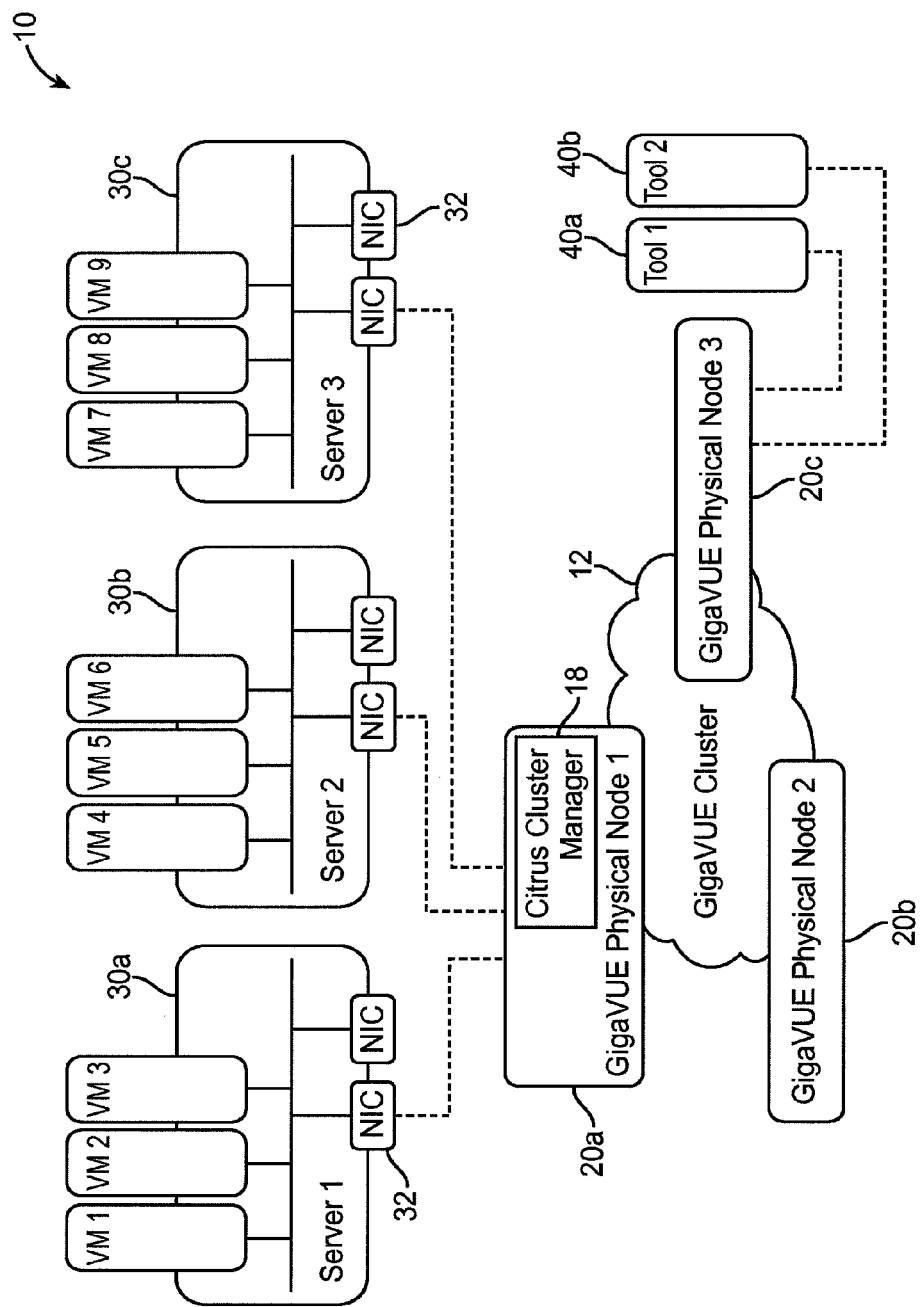
FIG. 1 illustrates a traffic visibility network in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

In accordance with some embodiments, a network visibility device is provided. The network visibility device is configured to communicatively couple to different network devices (such as switches, routers, firewalls, servers, etc.). In some embodiments, the network visibility device may be implemented as an appliance, which includes a housing, a plurality of ingress and egress ports, and one or more processing units in the housing. In other embodiments, the network visibility device may be implemented using one or more computers. For example, in some embodiments, the network visibility device may be implemented as a virtual machine. In further embodiments, the network visibility device may be implemented as component(s) of one or more network switch devices. For example, in some embodiments, functionalities of the network visibility device may be implemented using one or more processing units at a network switch device.

In some embodiments, there may be multiple network visibility devices, each of which is implemented using a network switch device. As used in this specification, the term "network visibility device" may refer to a network switch appliance/device in some embodiments, or may refer to a separate device (e.g., a computer) that is communicatively coupled to a network switch appliance/device in other embodiments. Each of the network switch devices may include a plurality of network ports for receiving packets from a network, and a plurality of instrument ports for communicatively coupling to respective network monitoring instruments. The network visibility devices may communicate with each other through Telnet, FTP, HTTP, SSH, or any other communication protocols.

In some embodiments, by communicatively coupling multiple network visibility devices, a much larger traffic visibility network may be constructed, thereby creating a pervasive "Visibility Fabric". As used in this specification, the term "traffic visibility network" refers to all or part(s) of a network that can be "seen" by one or more network visibility devices. Also, in some embodiments, multiple network visibility devices may be communicatively coupled to each other to form one or more clusters. These clusters may be inter-connected via private networks or through the Internet through the use of tunneling mechanisms. The traffic sent from the network ingress ports to the tool egress ports is a copy of the production traffic as the cluster(s) are classified as an out-of-band traffic visibility network in some embodiments.

In some embodiments, the network visibility device(s) in a cluster may include logic that controls what ingress traffic is to be delivered to which egress port(s). Such ingress traffic may be packets received at a particular node in the traffic visibility network. The logic for controlling network traffic may be implemented using different techniques in different embodiments. In some embodiments, network visibility device may allow user-defined configurations to be input, which specify and define a single connection, aggregated connections, or multicast connections. Also, the network visibility device may allow filters, maps, or other packet processing logic to be applied on the traffic traversing the network visibility device or a cluster formed using the network visibility device in some embodiments.

In other embodiments, in which the network visibility devices are implemented using respective network switch devices, one or more tools communicatively coupled to a network switch device may provide communications (e.g., feedback, or management requests) to the network switch device. In such cases, the network switch device may then determine which egress port(s) to transmit the packets. In some cases, the network switch device may also reconfigure the network port-to-tool port configuration at the network switch device based on the input from the tool(s).

In further embodiments, the network switch device may detect certain event, and then create a connection (e.g., between a network port and one or more tool ports) based on the detected event. For examples, the detected event may be an occurrence or absence of particular packets that may occur during specific security anomalies (Denial-of-Service attack), or that may occur from a configuration change of the infrastructure. Also, in some embodiments, instead of or in addition to creating the connection, the network switch device in a cluster may also establish filter or map in response to the detected event.

In some embodiments, the connections between the stacked network switch devices, or between the clusters of network switch devices, can be statically configured by the user, or by one or more of the network switch devices, or configured by an auto-discovery and/or auto-connection protocol. In the embodiment in which the connections are automatically established in the traffic visibility network, the protocol for auto-establishment of such connections may leverage on the production network for signaling between the network switch devices, or it may run along the stacking links between the network switch devices. In some embodiments, one or more of the network switch devices may participate in the running of this protocol. In still further embodiments, the controlling of the network traffic through this traffic visibility network may be performed using control commands or actions originating from an external system or appliance, including but not limited to a centralized management appliance or a virtualized appliance.

Depending upon the traffic on the infrastructure, behavior of the infrastructure, and/or configuration of the infrastructure, it may not be necessary to send the selected packets as-is over the traffic visibility network to a set of tool ports (e.g., tool ports at network switch device(s)). In some cases the packets may be modified before they are forwarded to instrument port(s). For examples, the packets may be sliced, compressed, re-packaged, and/or tagged. Also, in some embodiments, characteristics of the traffic flow may be collected and packaged up as aggregated analytics, and then sent to specific management tools through a tool port at the network visibility device (e.g., a network switch device). In some embodiments, the characteristics of the traffic may be collected at a network switch device, and may then be transmitted to another network switch device, or to a non-transitory medium that is communicatively coupled to the network switch device. In some embodiments, the network switch device may perform packaging of the collected data, and then send the packaged data to one or more tools through one or more instrument ports at the network switch device. In other embodiments, the network switch device may also perform packet slicing, packet compression, dropping of packets, etc.

In some embodiments, as the performance of the networks increase, and as latency becomes a very important characteristic of certain applications (trading floors, converged-voice, etc.) a very high accuracy time-stamp engine may be deployed at each ingress port of the network switch device. To ensure a common "clock" across the whole infrastructure (e.g., across the complete architecture formed by different network switch device(s), and/or across all ports of the network switch device(s)), the time stamp engines in the network switch devices may be synchronized via GPS, PTP, NTP protocols, or any of other protocols. For example, each packet entering the network ingress port of a network switch device may be optionally time-stamped (e.g., with the time-stamp added to the packet). Then down-stream systems and tools (e.g., monitoring tools, other network switch device(s)) may extract the clock to gather very accurate timing and latency information.

One or more embodiments of the network visibility device (which may be implemented using a network switch device) described herein are advantageous because they may allow a relocated virtualized machine to be monitored. For example, in some situations, a virtualized machine may is moved from one physical host to another. This event may be detected by one or more devices (e.g., a tool, a network switch device, etc.), and may be communicated (e.g., automatically communicated) to a centralized management software via a virtualization management infrastructure. The centralized management software will then instruct the relevant network switch device(s) to both (1) set up new connection, and (2) delete the old one so that the traffic from the relocated virtualized machine will continued to be monitored although it is now resident on a different physical host. Note that the centralized management software mentioned here can run on a physical host or as a virtualized instance running inside a physical host. In some embodiments, the centralized management software may be considered to be an example of the network visibility device in some embodiments.

One or more embodiments of the network switch device (for implementing the network visibility device) described herein are also advantageous because they may allow data from a mobile data source to be continuously monitored. For example, a mobile user may move from one network segment to another where traffic from these network segments are captured by one or more network switch devices, or by one or more clusters. In order to ensure continuity of the capture of this user's traffic, the network switch device(s) may automatically adjust its network port-to-tool port connections dynamically, either through the network visibility device (e.g., a centralized management appliance), or based on detection of the user's credentials by the network switch device. This allows for the possibility of a subscription-based network security package to be offered to telecom customers. Also, in the case of law enforcement, a user under surveillance can be tracked down using the traffic visibility network formed by the network visibility device(s) even when he is mobile.

In some embodiments, when there is specific security issue or risk associated with a type of access device, the cluster(s) may establish traffic filters and maps so that traffic originating on or destined for a specific type of device is captured and forwarded to the monitoring tools.

In one or more embodiments, information (e.g., the presentation of traffic, traffic events and traffic analyses) obtained by the network visibility device from the traffic visibility network may be delivered to the users or subscribers on the specific network via fixed or mobile devices (including but not limited to tablets and smart phones). This enables IT personnel to trouble-shoot traffic issues where they are mobile and on-the-go. In one implementation, the network visibility device implemented through a network switch device may provide a user interface, which allows a user to access the information, which may be stored in a non-transitory medium at the network visibility device, or in a database that is communicatively coupled to the network visibility device. In some embodiments, the user interface may be a webpage presented on a screen (e.g., a computer screen, a tablet screen, a phone screen, etc.).

In one or more embodiments, the network visibility device may have access to different types of networks, such as Storage Area Networks, Fiber Channel, Fiber Channel over Ethernet (FCoE), or iSCSI networks. This allows the network visibility device to monitor, manage, and/or control different types of data associated with the different types of networks. The same concept of an out-of-band delivery of information from the network span ports or tapping ports to the tools applies and the analytics generated through the monitoring of different traffic types (storage being one example), will provide added-value visibility for attached network devices (including network-attached-storage systems).

Also, in one or more embodiments, the network visibility device implemented using a network switch device may create meta-data tags of packets that can be stored in a non-transitory medium (e.g., on servers) such that packets can be easily retrievable or queried based on the meta-data tags. As used in this specification, the term "medium" is not necessarily limited to one storage device, and may include multiple media.

Furthermore, in one or more embodiments, the network visibility device may provide monitoring and security infrastructure (e.g., the de-facto monitoring and security infrastructure) for the network. In addition to delivering packets from any network ports (which may be located at a network switch device implementing the network visibility device in some embodiments) to any tools on the traffic visibility network, this infrastructure also collects analytics and stores packets (possibly with meta-data tags) at locations where a tool (e.g., a network monitoring tool, which may or may not be communicatively coupled to a network switch device) can query such packets via an APIs and perform analysis based on these packets. Thus, important and powerful traffic analytics may be generated from the links and machines being monitored via the network switch devices and tools connected in the visibility network, creating significant value for IT Operations and Management teams. These analytics may quickly help in trouble-shooting a network problem across a global span, reducing overall time to identify and diagnose events that impact the stability of the network. The above also addresses the issue that very often a tool vendor spends a lot of R&D time and funds attempting to build solutions that manage all the ingress traffic (although some may be irrelevant for the tool) without "dropping" (losing) packets, rather than investing time and funding to developing analysis logic. Embodiments of the visibility network described herein allow a tool (which may be an "application" in some embodiments) to run on the network infrastructure provided by the network visibility device.

The following four figures illustrate a few examples of implementation of the traffic visibility network using network switch devices described herein. In the figures, the "Citrus Cluster Manager", "Citrus V-Cluster Manager", and "Citrus MHP" are parts of the visibility network described herein, the "GigaVUE Cluster" is a network formed by one or more network switch devices (wherein an example of such switch device is GigaVUE Traffic Visibility Switch).

In particular, FIG. 1 illustrates a traffic visibility network 10 in accordance with some embodiments. The network 10 includes a cluster 12, which is a combination of one or more traffic visibility switches (network switch appliances/devices) that are physically connected into a single individual virtual entity, which allows for any network ingress port at a network switch appliance to be connected to any tool egress port(s) at any network switch appliance(s) across the whole cluster. The network 10 also includes a cluster manager 18, which may be a software component (that exists on a standalone appliance or, on a network switch appliance that is a member of the cluster 12) which provides a central management for all components, functions, and tasks within the cluster 12.

As shown in the figure, the network 10 includes a number of physical nodes 20a-20c, each of which may be a network switch appliance that exists as a member of the cluster 12, and provides the physical connectivity into the network 10 under management/monitoring and the tools/systems that are providing the management/monitoring. Any one or more of the network switch appliances in the cluster 12 may be the physical node(s) 20. Also, in the illustrated embodiments, the cluster manager 18 is implemented as a software at node 20a (network switch appliance). In other embodiments, the cluster manager 18 may be implemented as software at a plurality of nodes (a plurality of network switch appliances). In further embodiments, the cluster manager 18 may also be implemented using a computer. For example, in some embodiments, the cluster manager 18 may run on a stand-alone PC or on a server (e.g., virtual server). In other embodiments, the cluster manager 18 may be implemented using a processing unit in a network switch appliance, or a plurality of processing units in respective network switch appliances.

In still further embodiments, the cluster manager 18 may be implemented using a mobile device (e.g., a cell phone, a smart phone, an emailing device, an iPad, a tablet, a laptop, etc.). In such cases, the mobile device may be used to manage various components (including the network switch devices 100) in the cluster 12. For example, in some embodiments, the mobile device may include a user interface that allows a user of the mobile device to enter commands for configuring one or more of the network switch devices 100 (such as, to set a port as a network port, to set a port as an instrument port, to change a mapping or a filter at a network switch device 100, to request information be transmitted from one device 100 to another device 100 or to a storage device, etc.). The user interface at the mobile device may also allow the user of the mobile device to retrieve data from one or more of the devices 100 or from a storage device that stores network traffic data.

As shown in the figure, the network 10 includes a number of servers 30a-30c, each of which has a number of network interface cards 32 for communication with the cluster manager 18. Each server 30 supports a plurality of virtual machines VM (which is a discrete virtual instance of a compute platform). The servers 30 are example of a network that may be connected to the cluster 12. In other embodiments, the network that may be connected to the cluster 12 may include any type of devices, including but not limited to mobile devices (e.g., cell phones, email devices, iPads, tablets, laptops, etc.), computers, communication devices, network devices (such as those used by phone companies and internet providers for transmission of packets), etc.

It should be noted that the servers 30a-30c do not need to be communicatively coupled to a same node 20a, and that the servers 30a-30c may be communicatively coupled to different nodes 20 in other embodiments.

As shown in the figure, the node (network switch appliance) 20c is communicatively coupled to two network monitoring tools 40a, 40b. In some embodiments, the network monitoring tools 40a, 40b may be directly and physically connected to the network switch appliance 20c. In other embodiments, the network monitoring tools 40a, 40b may be communicatively coupled to the network switch appliance 20c through a network (e.g., through the Internet). Also, in other embodiments, instead of two tools, the node 20c may be communicatively coupled to fewer than two network monitoring tools (e.g., one network monitoring tool), or more than two network monitoring tools. Other node(s) (network switch appliance(s)) 20 in the cluster 12 may also be communicatively coupled to other network monitoring tool(s). Although three nodes 20a-20c are shown in the illustrated embodiments, it should be understood that in other embodiments, the cluster 12 may have fewer than three nodes 20, or more than three nodes 20.

Figure 1A:
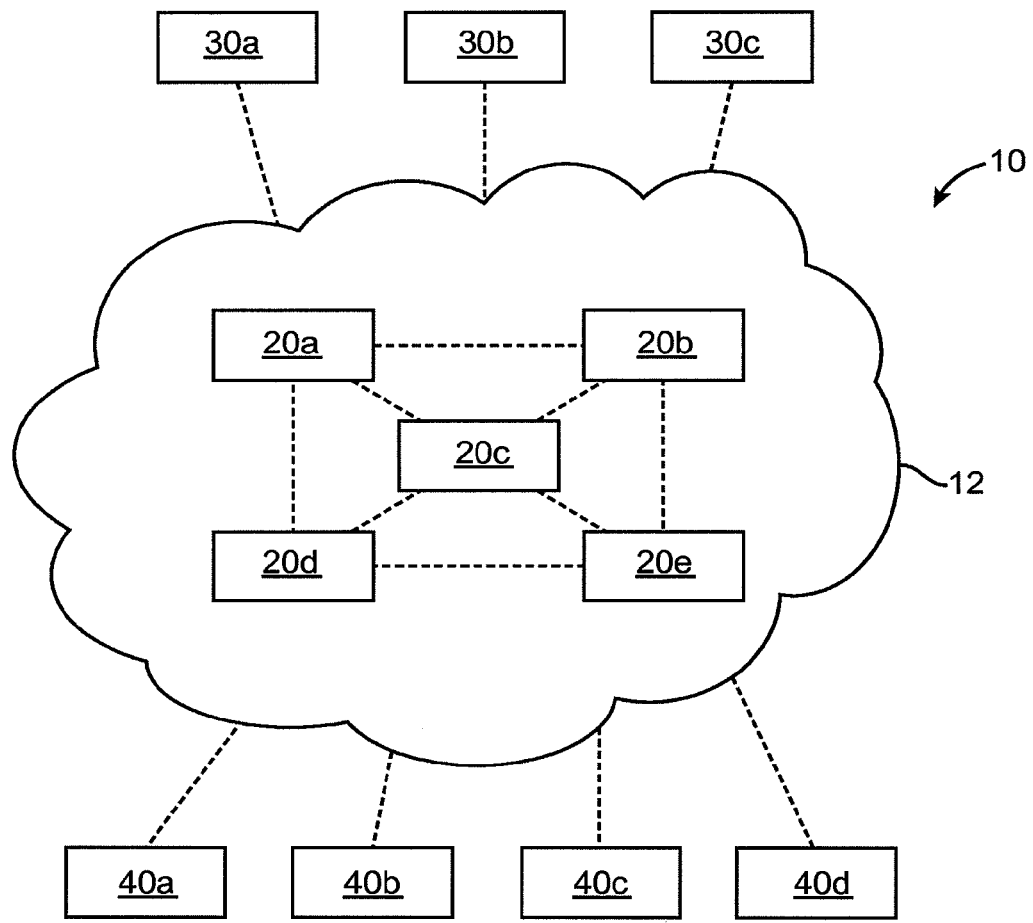
FIG. 1A illustrates another traffic visibility network in accordance with other embodiments.

FIG. 1A illustrates a variation of the network 10 in accordance with some embodiments. As shown in the figure, the cluster 12 includes five nodes 20a-20e that are communicatively coupled to each other to form a visibility network. The nodes 20a-20e are located at different geographical locations in some embodiments. Each of the nodes 20a-20e may be implemented using a network switch appliance. During use, the cluster 12 of network switch appliances 20a-20e receives packets from the packet sources 30a-30c, processes the packets, and transmits the packets to one or more network monitoring tools 40a-40d. Each of the packet sources 30a-30c may be a server that supports virtual machines, a computer, a mobile device (e.g., a cell phone, an iPad, a tablet, an emailing device, a laptop, etc.), or any of other types of devices that is capable of generating and/or transmitting network packets.

Figure 1B:
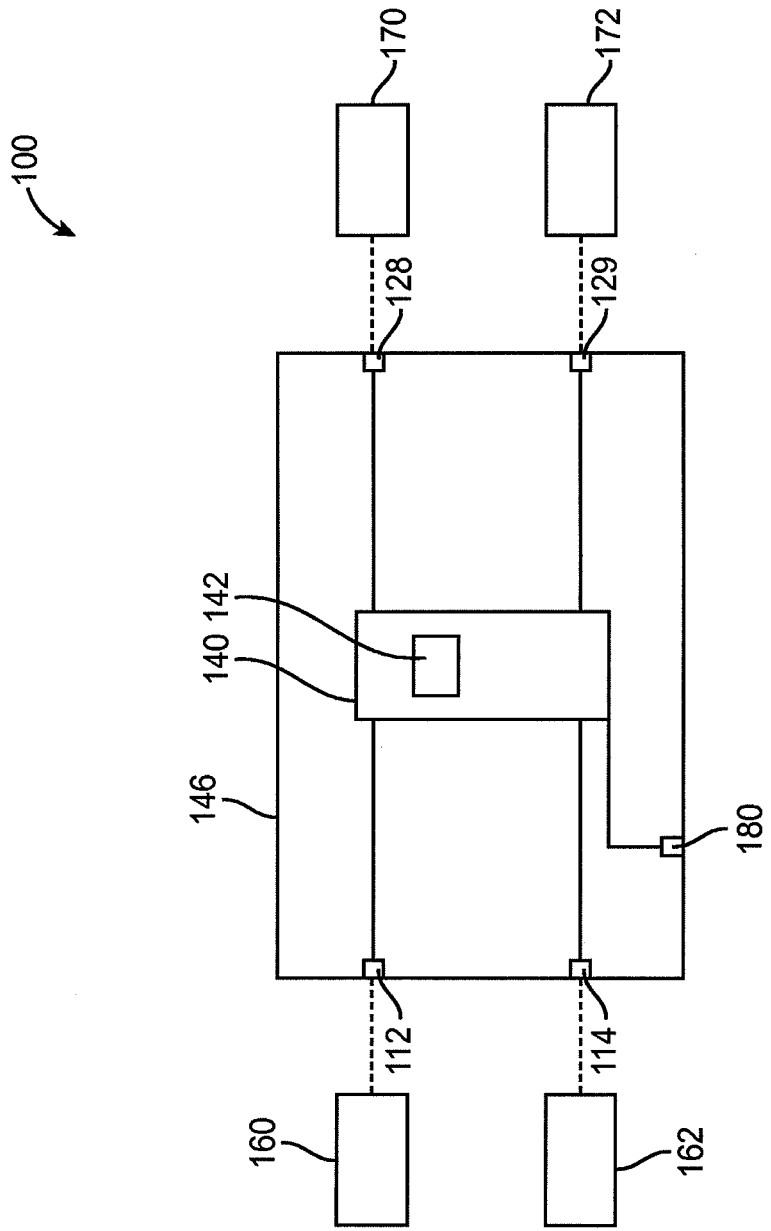
FIG. 1B illustrates a network switch device in accordance with some embodiments.

FIG. 1B illustrates a network switch device (network visibility device) 100 in accordance with some embodiments. The network switch device 100 may be used to implement one of the nodes 20 in the cluster 12. Also, in some embodiments, there may be a plurality of network switch devices 100 for implementing respective nodes 20 in the cluster 12. The network switch device 100 includes a first network port 112, a second network port 114, a first instrument port 128, and a second instrument port 129. The device 100 also includes a packet switch (switch module) 140 with a processing unit 142, and a network switch housing 146 for containing the packet switch 140. In the illustrated embodiments, the device 100 also includes other components, such as a Network PHY (not shown) coupled to each of the respective ports 112, 114, wherein the Network PHYs may be considered to be parts of the packet switch 140. Alternatively, the Network PHYs may be considered to be components that are separate from the integrated circuit 140. The PHY is configured to connect a link layer device to a physical medium such as an optical fiber, copper cable, etc. In other embodiments, instead of the PHY, the device 100 may include an optical transceiver, or a SERDES, etc. The housing 146 allows the device 100 to be carried, transported, sold, and/or operated as a single unit. The ports 112, 114, 128, 129 are located at a periphery of the housing 146. In other embodiments, the ports 112, 114, 128, 129 may be located at other locations relative to the housing 146. Although two network ports 112, 114 are shown, in other embodiments, the device 100 may include more than two network ports. Also, although two instrument ports 128, 129 are shown, in other embodiments, the device 100 may include only one instrument port, or more than two instrument ports. In some embodiments, the device 100 may have a plurality of ports that are not initially configured (e.g., assigned) as network or tool ports. In such cases, the user can declare which ports are network ports and which ports are instrument ports.

The device 100 may be an out-of-band device in some embodiments, in which cases, the device 100 does not participate in the production network traffic. In such cases, even if the device 100 is unavailable (e.g., uncoupled from the network), packets will be transmitted in the network to their intended recipients. In other embodiments, the device 100 may be an in-band device, in which cases, the device 100 participates in the production network traffic. In such cases, if the device 100 is completely unavailable (e.g., removed from the network), packets will not be transmitted to their intended recipients. In some embodiments, the device 100 may optionally include a bypass failover functionality for the in-band mode. In such cases, when the device 100 fails, the bypass failover mechanism kicks in, and packets in the production network can still be transmitted through device 100.

During use, the first network port 112 of the device 100 is communicatively coupled (e.g., via a network, such as the Internet) to a first node 160, and the second port 114 is communicatively coupled (e.g., via a network, such as the Internet) to a second node 162. The first node 160 may be any packet source, such as packet source 30. Similarly, the second node 162 may be any packet source, such as packet source 30. In some embodiments, the device 100 is configured to receive packets from one or both of the network ports 112, 114. In other embodiments, the device 100 is configured to transmit packets out of one or both of the network ports 112, 114 (e.g., in the situation in which the device 100 is communicating with another device 100 in a cluster of the visibility network). Also, during use, the instrument ports 128, 129 of the device 100 are communicatively coupled to respective instruments 170, 172. The instruments 170, 172 may be examples of the tools 40a, 40b shown in FIG. 1. The instruments 170, 172 may be directly coupled to the device 100, or communicatively coupled to the device 100 through the network (e.g., Internet). In some cases, the device 100 is provided as a single unit that allows the device 100 to be deployed at a single point along a communication path. In the illustrated embodiments, the packet switch 140 is configured to receive packets from nodes 160, 162 via the network ports 112, 114, and process the packets in accordance with a predefined scheme. For example, the packet switch 140 may pass packets received from one or more nodes to one or more instruments that are connected to respective instrument port(s) 128, 129.

In one or more embodiments, the packet switch 140 may be any switch module that provides packet transmission in accordance with a pre-determined transmission scheme. In some embodiments, the packet switch 140 may be user-configurable such that packets may be transmitted in a one-to-one configuration (i.e., from one network port to an instrument port). As used in this specification, the term "instrument port" refers to any port that is configured to transmit packets to an instrument, wherein the instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the instrument may be a pass-through device (i.e., it can receive packets, and transmit the packets back to the device 100 after the packets have been processed), such as an intrusion prevention system. In the pass-through arrangement, the packets go back to the production network after passing through the inline tool(s). In other embodiments, the packet switch 140 may be configured such that the packets may be transmitted in a one-to-many configuration (i.e., from one network port to multiple instrument ports). In other embodiments, the packet switch 140 may be configured such that the packets may be transmitted in a many-to-many configuration (i.e., from multiple network ports to multiple instrument ports). In further embodiments, the packet switch 140 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the device 100 so that the packets (or certain types of packets) are routed according to any one of these configurations. In some embodiments, the packet movement configuration is predetermined such that when the device 100 receives the packets, the device 100 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.).

Examples of packet switch 140 that may be used to implement features described herein include any of the commercially available network switch devices, such as GigaVUE™, that is available at Gigamon LLC. Other examples of packet switch 140 that may be used to implement features described herein are described in U.S. patent application Ser. Nos. 12/148,481, 12/255,561, 11/123,273, 11/123,465, and 11/123,377, the entire disclosure of all of which is expressly incorporated by reference herein.

In accordance with some embodiments, the packet switch 140 may have the functionalities of a conventional packet switch except that it provides visibility into various parts of a network. Thus, embodiments of the packet switch 140 may operate like a conventional managed packet switch, but providing packet monitoring function. This is accomplished by configuring the packet switch 140 to operate as a circuit switch under certain circumstances. In some embodiments, the configuring of the managed packet switch may be performed by utilizing a CPU interface of the switch to modify appropriate registers in the switch to allow for the desired operation. Also, in some embodiments, the packet switch 140 may be an "out-of-band" network switch, which is configured to obtain packets and pass them to an instrument or to a network that is different from that associated with the original intended destination of the packets.

It should be noted that the packet switch 140 that may be used with the device 100 is not limited to the examples described above, and that other packet switches 140 with different configurations may be used as well. Also, in one or more embodiments described herein, the packet switch 140 may be implemented using an integrated circuit, such as a processor (e.g., a general purpose processor, a network processor, an ASIC processor, a FPGA processor, etc.). Thus, the term "packet switch" or "switch module" may refer to any circuit that is capable of performing the functions described herein, and should not be limited to a switch or a processor.

As shown in the figure, the network switch device 100 further includes a port 180 for communication with other network switch device(s) (e.g., one or more nodes 20 in the cluster 12 shown in FIG. 1B). In some embodiments, the port 180 may be a bi-directional port, with an ingress port for receiving data, and an egress port for outputting data. In other embodiments, the port 180 may be implemented using one or both of the network ports 112, 114. In such cases, in addition to communicating with other network switch device(s), the port 180 may also receive network traffic that are being communicated between nodes (e.g., nodes 160, 162). Also, in further embodiments, the device 100 may include multiple ports 180.

In the illustrated embodiments, the processing unit 142 is illustrated as a component of the packet switch 140. In other embodiments, the processing unit 142 may be a separate component from the packet switch 140. The processing unit 142 may be implemented using a processor, such as a general processor, a network processor, an ASIC processor, a FPGA processor, etc. In other embodiments, the processing unit 142 may be a field processor. In further embodiments, the processing unit 142 may be a network card. Also, in some embodiments, the packet switch 140 may include ternary content-addressable memory (TCAM). The packet switch 140 may be configured to perform various packet processing functions, included but not limited to packet filtering, packet routing, packet switching, packet mirroring, packet aggregation, etc.

In some embodiments, the processing unit 142 may be used to implement the cluster manager 18, or part of the cluster manager. In such cases, the processing unit 142 at the device 100 provides a central management for all components (including other network switch devices 100), functions, and tasks within the cluster 12.

In accordance with some embodiments, the processing unit 142 is configured to receive packets from the network ports 112, 114, and/or from the port 180, and process the packets. In some embodiments, the processing unit 142 is configured to determine a type of the packet received, and determine whether to transmit the packet to instrument port 128 (for processing by network monitoring tool 170), to instrument port 129 (for processing by network monitoring tool 172), and/or to communication port 180 (i.e., for transmission of the packet to another network switch device) based on the determined type of the packet. In some embodiments, the type of the packet may be determined by examining header information of the packet.

Alternatively, or in addition to, using the type of packet to determine which port(s) to pass the packet, the processing unit 142 may use other information. For example, in other embodiments, the processing unit 142 may determine which port(s) to pass the packet based on workload. In further embodiments, the processing unit 142 may receive information regarding the source that transmits the packet, and use such information to pass packet to one or more of the instrument ports.

Also, in some embodiments, the passing of the packet to one or more of the instrument ports 128, 129 may be based on a packet transmission scheme that is either predetermined, or dynamically determined. For example, in some embodiments, the network switch device 100 may have a mapping (filter) that is stored in the network switch device 100, which prescribes which port(s) to pass the packet based on certain criteria.

Figure 1C:
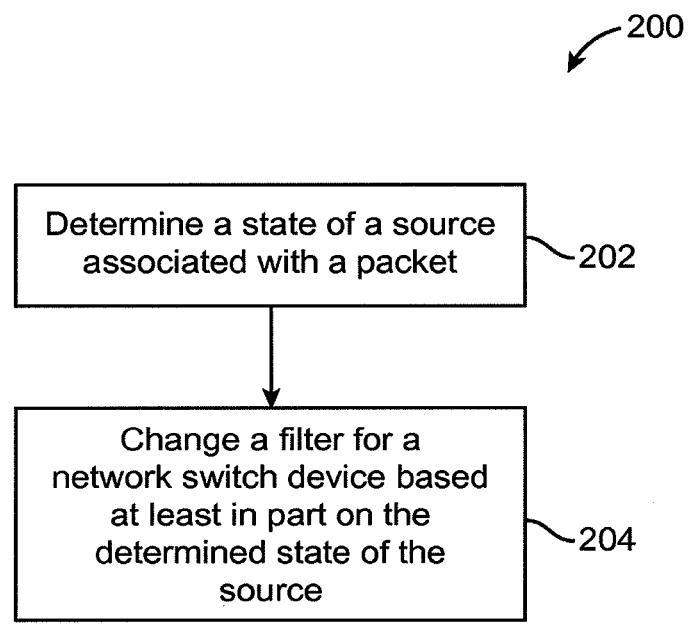
FIG. 1C illustrates a packet processing method in accordance with some embodiments.

Furthermore, in some embodiments, the processing unit 142 may be configured to determine a state of a source (e.g., source 30) that is associated with a received packet at multiple time points (Item 202 in the method 200 of FIG. 1C), and change the filter used by the network switch device 100 based at least in part on the determined state of the source (Item 204). In one or more embodiments, the filter may be configured for packet filtering to one or more of the instrument ports, and the act of changing the filter may include changing at least one of the one or more of the instrument ports (e.g., a destination instrument port) for the packet filtering.

Different techniques may be employed by the processing unit 142 for determining the state of the source in different embodiments. In some embodiments, the state of the source may be determined by receiving information regarding the source from an in-band device. In other embodiments, the state of the source may be determined by receiving information regarding the source from an out-of-band device (e.g., another network switch device that is in the cluster 12). For example, if the source is the traffic between two virtualized machines within a physical host, the state of the virtualized machines may be determined from their management software. The network switch device 100 can obtain the state of these virtualized machines through the API of the virtualization management software. For example, in the VMWare case, the virtualization management software can be vCenter. Another example is in software-defined networks (SDN). If the controller instructs an open flow switch to forward a particular flow of traffic to a different path, the visibility fabric may query the SDN controller (such as an Open Flow controller), learn about the new path, and activate the corresponding network switch device(s) 100 to continue to provide visibility to that flow of traffic.

As used in this specification, the term "in-band" device refers to a device that is involved in a transmission of a packet (that is transmitted from node 1 and intended for reception by node 2) to the intended receiving node 2. Also, the term "out-of-band" device refers to a device that is not involved in a transmission of a packet (that is transmitted from node 1 and intended for reception by node 2) to the intended receiving node 2. In some cases, a device may be both an in-band device and an out-of-band device with respect to processing different packets. For example, the network switch device 100 may be an in-band device if it receives a packet (intended for transmission from node 1 to node 2) from a network, and passes the packet back to the network (e.g., after the packet has been processed by a pass-through monitoring tool) for transmission downstream to the node 2. The same network switch device 100 may also be an out-of-band device if it receives another packet from the network, and does not pass the packet back to the network for transmission to the intended receiving node.

Also, in some embodiments, the state of the source may be determined by analyzing network traffic pattern from the source. For example, in some embodiments, the processing unit 142 may be configured to determine and track the percentage of usage for different types of network traffic for a particular user or source. In such cases, if the percentage of usage changes by a certain threshold, then the processing unit 142 may determine that the state of the source is "high risk" that may require an increased level of network monitoring. For example, the processing unit 142 may determine that a network traffic pattern associated with a user or a source has, on average, 60% usage for web traffic, 30% usage for email traffic, and 10% usage for database processing. In such example, the processing unit 142 may periodically check the network traffic pattern for the user or the source. If the processing unit 142 determines that the network traffic pattern deviates from the average network traffic pattern by a certain threshold (e.g., deviates by more than 20%), then the processing unit 142 may determine that the state of the source has changed to a different state (e.g., a "high risk" state).

In other embodiments, the source 30 may be a user of a device that provides the packet, and the act of determining the state of the source may comprise determining a state of the user. For example, in some embodiments, the processing unit 142 may determine the state of the user based on the devices being used by a certain user. In some embodiments, the processing unit 142 may determine that the state of the source changes when a user uses different devices for sending packets. For example, when a user is using a first device (e.g., a first computer), the processing unit 142 may determine that the state of the source (e.g., user) is "low risk", and when the user is using a second device (e.g., a second computer), the processing unit 142 may determine that the state of the source (e.g., user) is "high risk".

In further embodiments, the processing unit 142 may be configured to determine the state of the source (e.g., user) based on a location of the device being used by the user (or the location of the user). For example, when the user is at a first geographical location, the processing unit 142 may determine that the state is "low risk", and when the user is at a second geographical location, the processing unit 142 may determine that the state is "high risk". The user may be using different devices, or the same device (e.g., a mobile device), in the different geographical locations. In such cases, the network switch device 100 may pass the packet to different sets of instrument port(s) based on the geographical location of the user.

In other embodiments, the processing unit 142 may determine the state of the user by determining an activity being performed by the user. For example, if the network switch device 100 determines that a type of activity being performed by the user is considered high risk, the network switch device 100 may pass the packet to different set of instrument ports (e.g., to more instrument ports) to provide an increased level of network monitoring for the user.

In some embodiments, the determined state of the source may indicate whether an increased level of network monitoring is desired. For example, in some embodiments, if the determined state of the source has a first state value (e.g., "low risk" state), then the network switch device 100 passes the packet to a first one of the instrument ports (e.g., instrument port 128), and if the determined state of the source has a second state value, then the network switch device 100 passes the packet to a second one of the instrument ports (e.g., instrument port 129). In other embodiments, if the determined state of the source has a first state value, then the network switch device 100 passes the packet to one of the instrument ports (e.g., instrument port 128/129), and if the determined state of the source has a second state value (e.g., a "high risk" state), then the network switch device 100 passes the packet to two of the instrument ports (e.g., to instrument ports 128, 129).

In the above embodiments, the determination of the state of the source, and the passing of the packets to one or more of the instrument ports, have been described with reference to the network switch device 100. It should be understood that in other embodiments, the network switch device 100 may be a part of the cluster 12 (like that shown in FIGS. 1 and 1A), and that the determination of the state of the source, and/or the passing of the packets to one or more of the instrument ports may be performed by the cluster 12 (i.e., a combination of the network switch devices 100 that implement the nodes 20). For example, in some embodiments, different network switch devices 100 may receive packets that are associated with a same source (e.g., device or user) at different points in time. In such cases, the cluster manager 18 may be configured to keep track of the packets that are associated with the same source, and determine the state of the source at the different time points. Also, in some embodiments, the cluster manager 18 may change one or more filters in the cluster 12 based on the determined state of the source. For example, the cluster manager 18 may change one or more filters in one or more of the network switch devices 100 in the cluster 12 based on the determined state, so that the packets may be passed to different sets of network monitoring tools based on the determined state of the source. The cluster manager 18 may be implemented using the processing unit 142 at a network switch device in some embodiments. In other embodiments, the cluster manager 18 may be implemented using a plurality of processing units 142 at respective network switch devices 100 in other embodiments. In further embodiments, the cluster manager 18 may be implemented using one or more computers, or one or more servers.

In some embodiments, during use, the network switch devices 100 in the cluster 12 may communicate with each other using the port 180, the network port 112, the network port 114, or any combination of the foregoing. For example, in some embodiments, a packet received by a first one of the network switch devices 100 may be transmitted through port 180/112/114 to a second one of the network switch devices 100, which receives the packet at its port 180/112/114. Also, in some embodiments, information regarding one or more of the sources 30 (e.g., state of a source, ID, network traffic behavior, etc.), information regarding the cluster 12 (e.g., number of network switch devices 100 in the cluster 12, identifications of the network switch devices 100 in the cluster 12, workload of the network switch device 100, etc.), and information regarding the network monitoring tool(s) 40 (e.g., number of tools, identifications of the tools, filter/mapping information that involves one or more of the tools, etc.), may be communicated between the network switch devices 100 through port 180/112/114.

Figure 2:
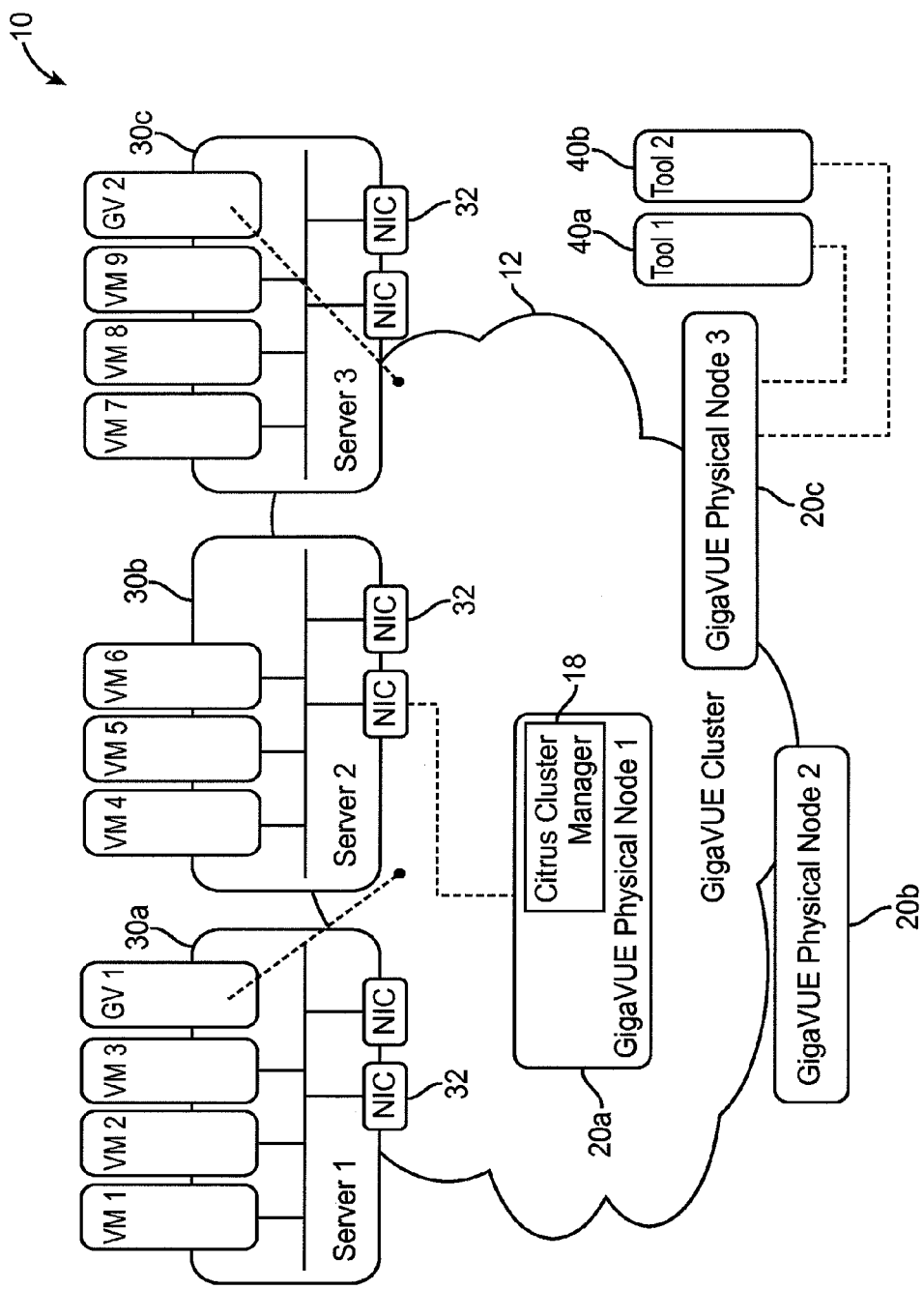
FIG. 2 illustrates a traffic visibility network in accordance with other embodiments.

FIG. 2 illustrates a traffic visibility network 10 in accordance with other embodiments. The network 10 is similar to that described with reference to FIG. 1, except that one of the virtual nodes (i.e., the node 202) supported by a server 30*a* is a software instance of a network processing node that provides similar/same capabilities as one or more of the network switch appliances (e.g., the software instance may provide packet processing functionalities, including but not limited to traffic ingress, filtering, mapping and traffic egress). Similarly, virtual node 204 supported by a server 30*c* is also a software instance of a network processing node that provides similar/same capabilities as one or more of the network switch appliances. The network processing node, although a software-only node, is an active member of the cluster 12 and is managed by the cluster manager 18. Thus, as used in this specification, the term "network switch appliance", "network switch device", or any of other similar terms, is not necessarily limited to a physical device, and may alternatively be referred to a virtual machine. In the embodiments, in which the network switch device is implemented as a virtual machine, the network ports for receiving packets may be virtualized network ports, the instrument ports for passing packets to network monitoring tools may be virtualized instrument ports, and the processor of the network switch device that performs packet processing may be the processor of the server that supports the virtual machine, or may be considered a virtualized processor.

Figure 3:
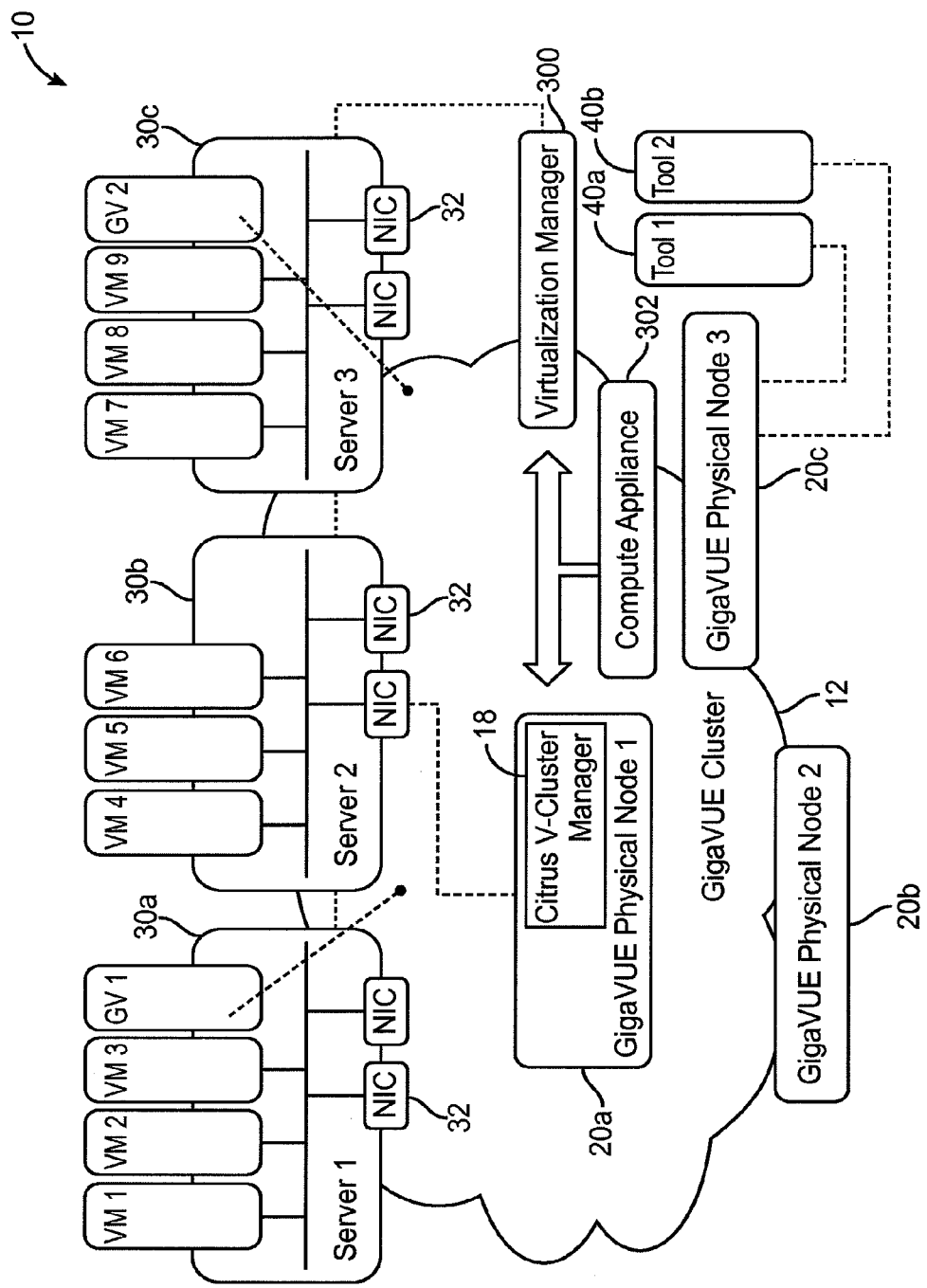
FIG. 3 illustrates a traffic visibility network in accordance with other embodiments.

FIG. 3 illustrates a traffic visibility network 10 in accordance with other embodiments. The network 10 is similar to the embodiment described with reference to FIG. 2, except that the cluster manager 18 is configured to create/provide an integration architecture allowing management software of the Virtualized Machines (VMs) to openly communicate to and from the cluster manager 18 and it's configuration information & database. The network 10 also includes a virtualization manager 300, which may be a management system (software and/or hardware) provided by a vendor of the Virtual Machines (VMs). The manager 300 is an example of a management platform that interfaces the servers 30 and/or Virtual Machines VMs (sources) with the cluster 12. In other embodiments, the manager 300 may be other types of manager. For example, in other embodiments, the manager 300 may be a management system (software and/or hardware) for interfacing mobile devices with the cluster 12.

In the illustrated embodiments, the network 10 also includes a compute appliance 302, which may be a server running integration software that enables the integration between the cluster manager 18 and the virtualization manager 300. The compute appliance 302 will have an understanding of the whole cluster 12 and the infrastructure that the virtualization manager 300 is managing.

Figure 4:
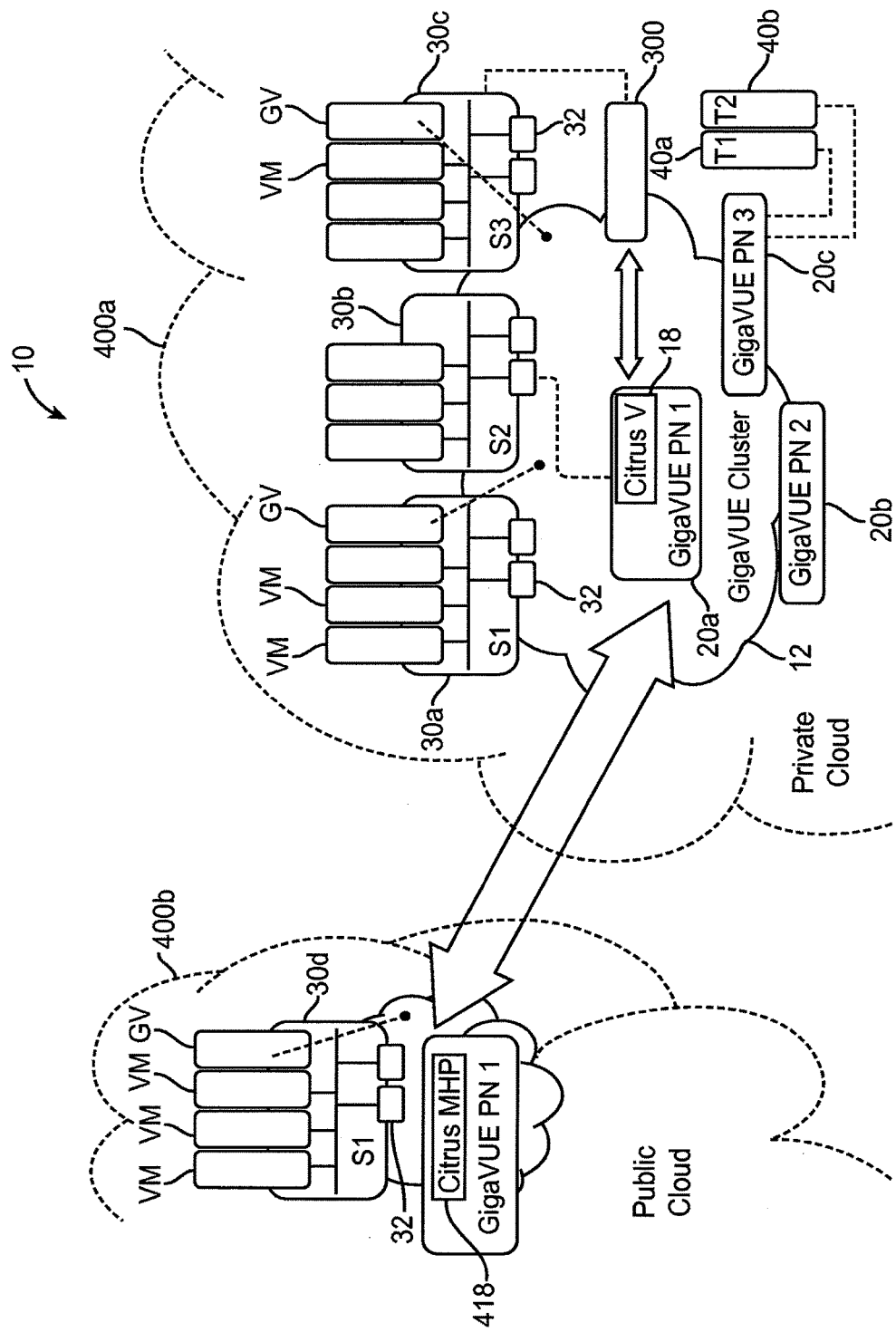
FIG. 4 illustrates a traffic visibility network in accordance with other embodiments.

FIG. 4 illustrates a traffic visibility network 10 in accordance with other embodiments. The network 10 is similar to the embodiment described with reference to FIG. 3, except that the network 10 is divided into a private network 400*a*, and a public network 400*b*. The private network 400*a* is an infrastructure within an Enterprise that is running some variant of virtualization. The public network 400*b* is an infrastructure that is located within a third-party facility (at a "Managed Hosting Providers" (MHP) location) that provides compute capacity, applications or services that are used by the Enterprise. In the public network 400b, one of the nodes has a cluster manager 418 that provides services and capabilities that are specifically required by the Managed Hosting Provider market place including, but not limited to multi-tenant capability that creates many discrete sub-divisions within one larger cluster so that specific customer, service, application of infrastructure traffic can be segregated.

In the above embodiments, the network switch device 100 and the cluster 12 have been described as passing packets to one or more network monitoring tools 40. In other embodiments, the network switch device 100 or the cluster 12 may not pass packets to network monitoring tools. Instead, the network switch device 100 or the cluster 12 may transmit the packets to a non-transitory medium for storing the packets, so that the packets may be later retrieved by one or more network monitoring tools 40, which analyze the packets.

Figure 5A:
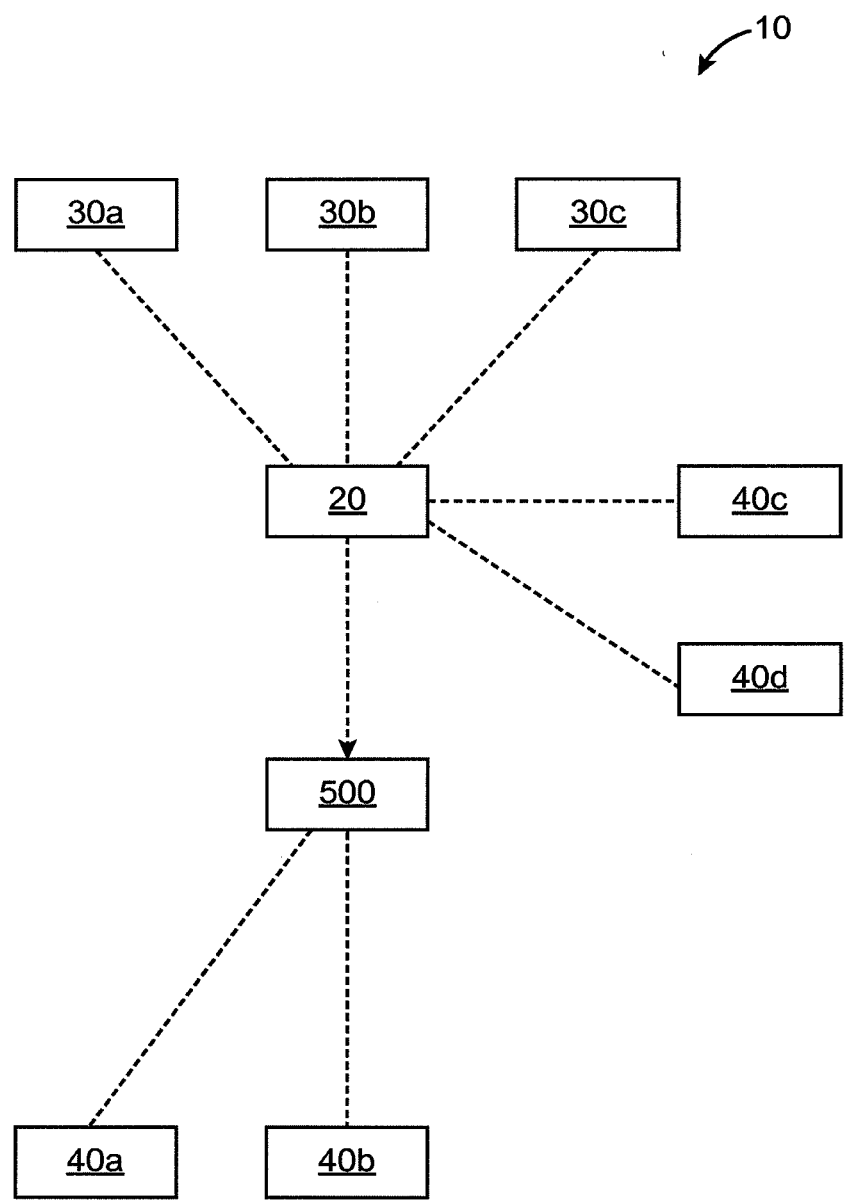
FIG. 5A illustrates another network in accordance with other embodiments.

FIG. 5A illustrates a network 10 in accordance with other embodiments. In the network 10 of FIG. 5A, the node 20 (which may be implemented using the network switch device 100 of FIG. 1B) is configured to receive packets from the sources 30a-30b, and transmit the packets to a non-transitory medium 500 for storing the packets. The non-transitory medium 500 may be any storage device that is capable of storing data. Also, in some embodiments, the non-transitory medium 500 may be implemented using a plurality of storage devices that are communicatively coupled to each other. In the illustrated embodiments, after the packets are stored, one or more network monitoring tools 40a, 40b may access the non-transitory medium 500 to retrieve the packets, and may then analyze the retrieved packets. Thus, unlike the previous embodiments in which the packets are "pushed" to one or more network monitoring tools, in the illustrated embodiments, the packets are "pulled" by one or more of the network monitoring tools. As shown in the figure, optionally, the node 20 (or network switch device 100) may also send some of the packets to one or more network monitoring tools 40c, 40d in a push-configuration for packet analysis.

In other embodiments, the network 10 of FIG. 5A may include a plurality of nodes 20 that form a cluster 12 (like that shown in FIG. 1A). The cluster 12 of the nodes 20 is configured to receive packets from the sources 30a-30b, and transmit the packets to a non-transitory medium 500 for storing the packets. After the packets are stored, one or more network monitoring tools 40a, 40b may access the non-transitory medium 500 to retrieve the packets, and may then analyze the retrieved packets. Optionally, the cluster 12 may also send some of the packets to one or more network monitoring tools 40c, 40d in a push-configuration for packet analysis.

Figure 5B:
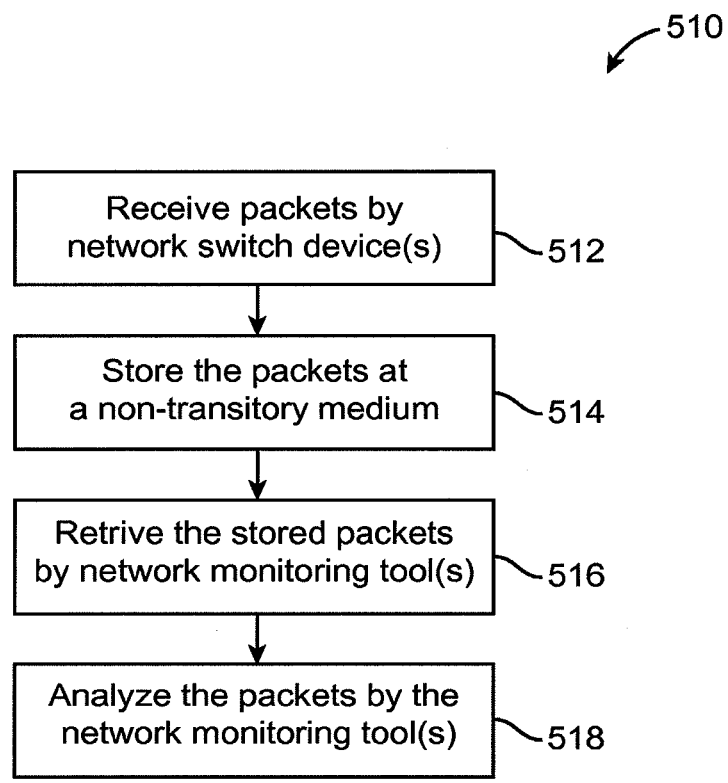
FIG. 5B illustrates a packet processing method in accordance with other embodiments.

FIG. 5B illustrates a method 510 of processing packets that involves storing the packets in accordance with some embodiments. In item 512, packets are received. This may be performed by the network switch device 100 in some embodiments, or by a plurality of network switch devices 100 in the cluster 12 in other embodiments. Next, the packets are transmitted to the non-transitory medium 500 for storage (item 514). In some embodiments, the packets that are transmitted to the non-transitory medium 500 are a subset of the packets received by the network switch device(s) 100. For example, in some embodiments, the packet switch device(s) 100 may be configured to pass certain packets to the non-transitory medium 500 for storage in response to a detection of a certain event. By means of non-limiting examples, the event may be a transmission failure, a web crash, an intrusion event, a power failure event, a change of a state of a source, etc. Also, in some embodiments, the packets may be modified before storing them at the non-transitory medium 500. For example, one or more portions (e.g., header information) of a packet may be removed, data (e.g., time stamp, tagging (such as tagging an ingress port where the packet was first seen by the network switch device)) may be added to a packet, and portion(s) of a packet may be rearranged (e.g., header info may be moved to a tail portion), etc.

After the packets are stored, one or more network monitoring tools (e.g., tools 40a, 40b) may then access the non-transitory medium 500 to retrieve the stored packets (Item 516). In some embodiments, the network monitoring tool(s) may be configured to periodically access the non-transitory medium 500 to retrieve the packets. In other embodiments, the network monitoring tool(s) may be configured to access the non-transitory medium 500 to retrieve the packets in response to receiving a signal from one or more of the network switch devices 100. For example, in some embodiments, when a certain event has occurred, one or more of the network switch devices 100 may transmit a signal to the network monitoring tool(s), to instruct the network monitoring tool(s) to retrieve certain stored packets from the non-transitory medium 500. By means of non-limiting examples, the event may be a transmission failure, a web crash, an intrusion event, a power failure event, a change of a state of a source, etc. Also, in some embodiments, the signal transmitted from the network switch device(s) may include information regarding the packets to be retrieved, such as time stamped information, session ID, source address, destination address, any information from the header, or any combination of the foregoing. After the network monitoring tool(s) has retrieved the stored packets, the network monitoring tool(s) may then analyze the packets (Item 518).

In one or more embodiments, each source 30 may be a network device, such as a network device used by a communication company (e.g., a phone company or an Internet service provider company). In such cases, the transmission of packets from the sources 30 to the network switch device 100 or the cluster 12 of network switch devices 100 may be performed on a subscription basis. For example, if a customer (end user) of the communication company wishes to obtain network monitoring services, the communication company may offer such services as an option for the end user. If the end user signs up (subscribes) for such services, the communication company may then transmit packets for such end user to the network monitoring device 100, or to the cluster 12 of network monitoring devices 100, which passes the packets downstream for analysis by one or more network monitoring tools 40. On the other hand, if the end user does not subscribe for any network monitoring services, then the communication company may not transmit packets to the network monitoring device 100, or to the cluster 12 of the network monitoring devices 100.

Figure 6:
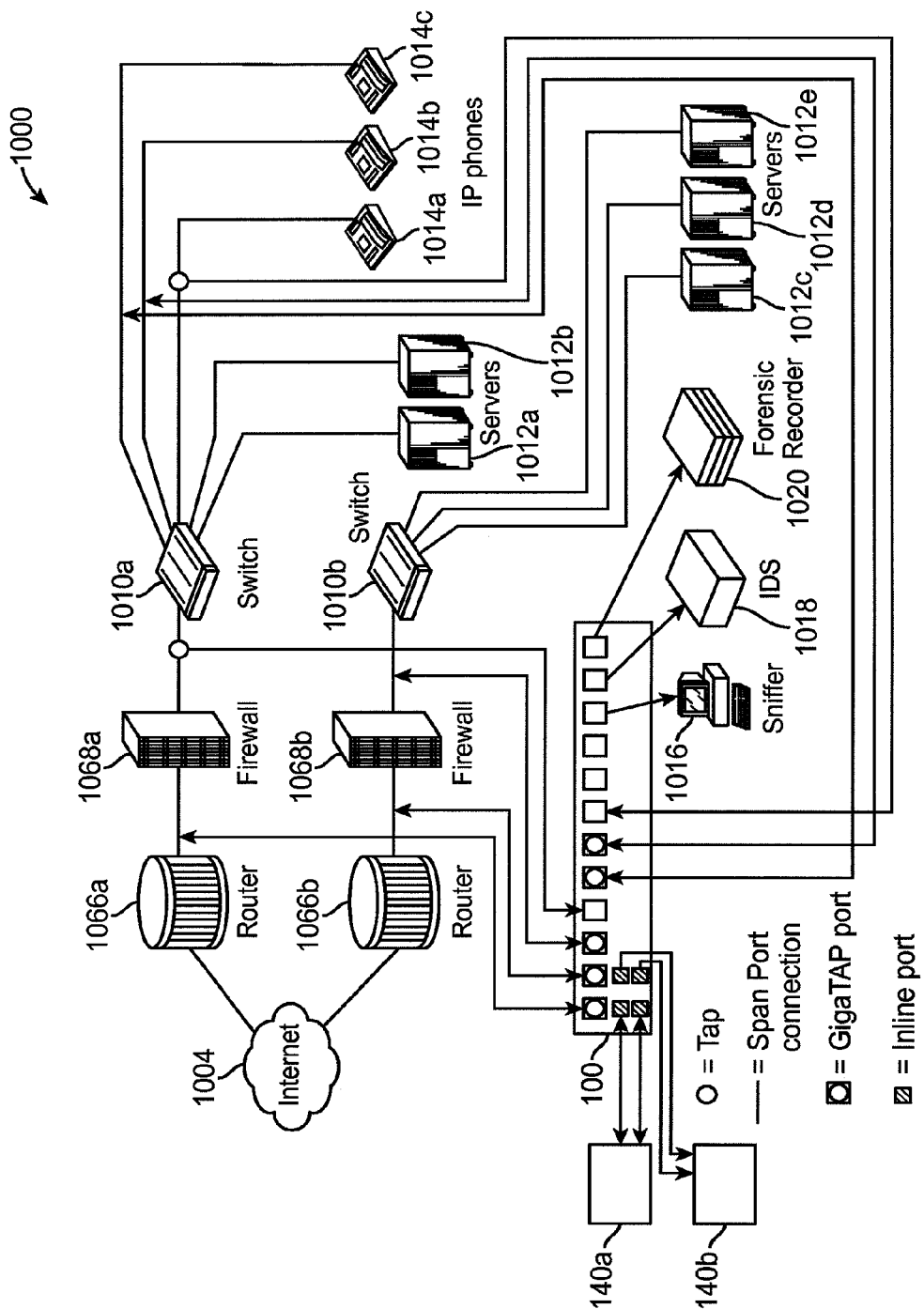
FIG. 6 illustrates a deployment of a network appliance in accordance with some embodiments.

FIG. 6 shows the deployment of the network switch device 100 in a network environment 1000 in accordance with some embodiments. Although one network switch device 100 is shown, it should be understood that in some embodiments, there may be multiple network switch devices 100 that form the cluster 12, in which cases, each of the network switch devices 100 may be in the same network environment 1000 or in respective environments 1000. The Internet 1004 is coupled via routers 1006a-b and firewalls 1068a-b to two switches 1010a and 1010b. Switch 1010a is coupled to servers 1012*a-b* and IP phones 1014*a-c*. Switch 1010*b* is coupled to servers 1012*c-e*. A sniffer 1016, an IDS 1018 and a forensic recorder 1020 (collectively, "non-pass through instruments") are coupled to the device 100. As illustrated in FIG. 6, there is a reduction on the number of non-pass through instruments in this deployment as compared to a conventional configuration (in which there may be one or more non-pass through instruments between router 1066*a* and firewall 1068*a*, one or more non-pass through instruments between firewall 1068*a* and switch 1010*a*, one or more non-pass through instruments between router 1066*b* and firewall 1068*b*, and firewall 1068*b* and switch 1010*b*) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014*a-c* can be easily configured to be sent to an IDS 1018. It is also possible that traffic inside a particular IP phone 1014*a-c* connection can be sent to a sniffer 1016, and Intrusion Detection System 1018 and a forensic recorder 1020 simultaneously via the one-to-many function.

In some embodiments, when using the device 100, one or more non-pass through instruments (such as IDS, sniffer, forensic recorder, etc.) may be connected to instrument port(s), and one or more pass through instruments 140*a*, 140*b* (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them (such as making a decision to pass or drop a packet), and then pass the packets downstream towards the intended recipient node). In some cases, by having both an IDS and an IPS connected to the device 100, the device 100 can compare whether the IDS or the IPS sees more threats, and/or can have a redundant protection such that if the IPS misses any threat, the IDS may pick it up.

Computer System Architecture

Figure 7:
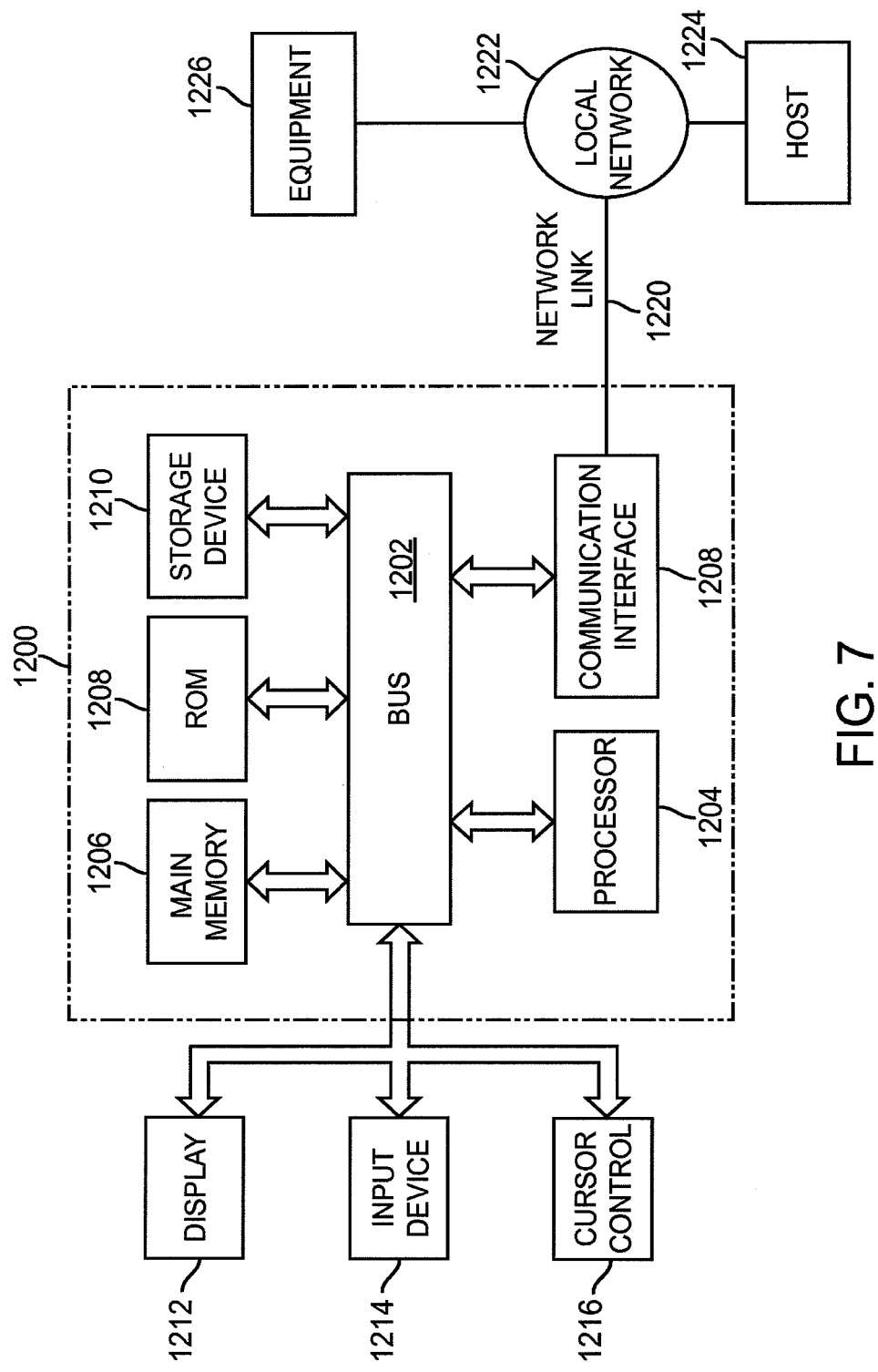
FIG. 7 illustrates an example of a computer system with which embodiments described herein may be implemented.

FIG. 7 is a block diagram that illustrates an embodiment of a computer system 1200 upon which embodiments described herein may be implemented. For example, in some embodiments, the computer system 1200 may be used to implement one or more functions of the processing unit 142, or one or more functions of the switch 140 described herein. Computer system 1200 includes a bus 1202 or other communication mechanism for communicating information, and a processor 1204 coupled with the bus 1202 for processing information. The processor 1204 may be used to perform various functions described herein. For example, in some embodiments, the processor 1204 may receive input from a user for configuring a network component (e.g., the component 380).

The computer system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The computer system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The computer system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The computer system 1200 may be used for performing various functions in accordance with the embodiments described herein. According to one embodiment, such use is provided by computer system 1200 in response to processor 1204 executing one or more sequences of one or more instructions contained in the main memory 1206. Such instructions may be read into the main memory 1206 from another computer-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the computer system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The computer system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the computer system 1200, are exemplary forms of carrier waves transporting the information. The computer system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method of packet processing comprising:
    operating a plurality of network appliances as a cluster, wherein two or more of
    the plurality of network appliances in the cluster are communicatively coupled to each other via a first network;
    receiving a packet from a second network by one of the network appliances in the cluster, the second network including a transmitting node that transmits the packet and a receiving node that is an intended recipient of the packet;
    determining a state of a source associated with the packet;
    processing the packet based on the state of the source using two or more of the network appliances in the cluster;
    and passing the packet from one or more of the network appliances in the cluster to one or more network monitoring tools, the one or more network monitoring tools being configured to perform packet analysis and not being the intended recipient of the packet, wherein said passing the packet includes, if the determined state of the source has a first state value, then passing the packet to a first subset of the one or more network monitoring tools, and if the determined state of the source has a second state value, then passing the packet to a second subset of the one or more network monitoring tools.

2. The method of claim 1, further comprising changing a network traffic mapping utilized by one or more of the plurality of network appliances based on the determined state of the source.

3. The method of claim 1, wherein the state of the source is determined by receiving information regarding the source from an in-band device.

4. The method of claim 1, wherein the state of the source is determined by receiving information regarding the source from an out-of-band device.

5. The method of claim 1, wherein the state of the source is determined by analyzing network traffic pattern from the source.

6. The method of claim 1, wherein the plurality of network appliances comprises a first network appliance and a second network appliance, and said processing the packet comprises passing the packet from the first network appliance to the second network appliance.

7. The method of claim 6, wherein each of the first and second network appliances has a network port for receiving packets from a network, and an instrument port.

8. The method of claim 6, wherein each of the first and second network appliances is an out-of-band device.

9. A packet processing system comprising:
    a plurality of network appliances forming a cluster, wherein two or more of the plurality of network appliances in the cluster are communicatively coupled via a first network and are configured to collectively perform out-of-band packet processing, the first network including a transmitting node that transmits a packet and a receiving node that is an intended recipient of the packet;
    wherein the cluster is configured to receive the packet from a second network determine a state of a source associated with the packet, pass the packet to one or more network monitoring tools based on the state of the source, wherein the cluster is configured to pass the packet to a first subset of the one or more network monitoring tools if the determined state of the source has a first state value, and to pass the packet to a second subset of the one or more network monitoring tools if the determined state of the source has a second state value, the one or more network monitoring tools being configured to perform packet analysis and not being the intended recipient of the packet.

10. The packet processing system of claim 9, wherein the cluster is configured to change a network traffic mapping utilized by one or more of the plurality of network appliances based on the determined state of the source.

11. The packet processing system of claim 9, wherein the cluster is configured to determine the state of the source by analyzing network traffic pattern from the source.

12. The packet processing system of claim 9, wherein the determined state of the source indicates whether an increased level of network monitoring is desired.

13. The packet processing system of claim 9, wherein the plurality of network appliances comprises a first network appliance and a second network appliance, and the cluster is configured to process the packet by passing the packet from the first network appliance to the second network appliance.

14. The packet processing system of claim 13, wherein the packet is passed from a stacking egress port at the first network appliance to a stacking ingress port at the second network appliance.

15. The packet processing system of claim 13, wherein each of the first and second network appliances has a network port for receiving packets from a network, and an instrument port.

16. The packet processing system of claim 13, wherein each of the first and second network appliances is an out-of-band device.

17. A packet processing system comprising:
a network switch appliance having a network port configured to receive a packet from a network;
a plurality of instrument ports, each configured to be coupled to a different one of a plurality of network monitoring instruments;
and a processor configured to determine a state of a source associated with the packet at a plurality of time points, and to determine, based at least in part on the determined state of the source, one or more of the plurality of network monitoring instruments to which to send the packet, via a corresponding one or more of the instrument ports, after the packet has been processed by the packet processing system, wherein if the determined state of the source has a first state value, then the network switch appliance passes the packet to a first subset of the one or more instrument ports and if the determined state of the source has a second state value, then the network switch appliance passes the packet to a second subset of the one or more of the instrument ports.

18. The packet processing system of claim 17, wherein the processor is configured to determine the state of the source by analyzing network traffic pattern from the source.

19. The packet processing system of claim 17, wherein the source comprises a user of a device that provides the packet, and the processor is configured to determine the state of the source by determining a state of the user.

20. The packet processing system of claim 17, said system comprising a plurality of network switch appliances, including said network switch appliance, wherein the first and second subsets of the plurality of instrument ports include first and second instrument ports, respectively, on different ones of the plurality of network switch appliances.

* * * * *